Patented Aug. 7, 1945

2,381,479

UNITED STATES PATENT OFFICE 2,381,479

METHOD OF PROVIDING MATTE SURFACES UPON GLASS

Frederick W. Adams, Pittsburgh, Pa., assignor to Pittsburgh Plate Glass Company, Allegheny County, Pa., a corporation of Pennsylvania No Drawing. Application March 13, 1943, Serial No. 479,061

2 Claims. (Cl. 41—42)

The present invention relates to the etching of polished glass surfaces and it has particular relation to the etching of such surfaces, in order to provide a matte or dull finish.

One object of the invention is to provide a process of etching glass in order to reduce surface brilliance, which results in a novel and pleasing texture effect or pattern.

A second object of the invention is to provide a process of the foregoing character, which is simple and economical to operate.

These and other objects of the invention will be apparent from consideration of the following specification and the appended claims.

It is well known that glass as it is obtained from most forming operations or after it has been subjected to grinding and polishing is highly polished and therefore specularly reflects much light, thus often producing objectionable glare. It has been proposed to eliminate this glare by exposing the glass to the action of an acid, which attacks the surface of the glass, thus destroying the polish and producing a matte effect. Such process, as heretofore employed, has resulted in relatively uniform etching of the entire surface.

According to the provisions of the present invention it is proposed to break up the etching into a somewhat stippled pattern by applying to the surface of the glass a layer of inert granular material, such as sand, which is cohered together by a binder preferably in the form of individual coatings upon the particles to provide a porous layer. The inert material provides points of protection over the surface of the glass, but at the same time etching acid, such as hydrofluoric acid will permeate the porous body to attack those portions of the surface which are not protected.

In the practice of the invention, substantially any inert finely-divided solid material may be employed. It of course is necessary that the material be in a suitable state of subdivision to give the desired texture to the glass surface as a result of the etching operation. Sand or other form of silica is probably one of the cheapest and most convenient materials for the purpose. The sand may either be ordinary sand or it may be a very finely-divided form of sand, such as that resulting from the surfacing of glass plates in a grinding operation with a slurry of sand as an abrasive. In some instances potter's flint may, also, be employed. Other pulverulent or granular material, such as silicon carbide or carborundum, aluminum oxide, etc., may be employed in place of silica.

It is desirable that the granular or pulverulent material be coated with a bonding and protective material, such as an organic plastic. Among such plastics or binders may be included rubber, rubber hydrochloride, rubber chloride, polyvinyl butyral polymerized vinyl chloride, the copolymer of vinyl chloride and vinyl acetate known as Vinylite "H," chlorinated diphenyl, methyl methacrylate resins, paraffin, beeswax or other form of coating material which is relatively inert and which will provide certain degree of bond between the particles of inert material.

The coated inert material should be applied to the surface as a thin layer in which the individual particles are coated and bonded together, but in which the interstices between the individual particles are not completely filled, thus assuring an adequate degree of permeability of the layer to the acid which is subsequently to be applied to etch the surface of the glass. This effect may be obtained in various ways.

One convenient way would involve introducing finely-divided inert material, such as sand, into a solution or suspension of the plastic, then agitating the resultant mixture and evaporating off the solvent for the plastic, the solution containing insufficient plastic completely to fill all interstices in the inert material when it is dried. In this way the particles of plastic become coated with individual films of plastic. The coated material may be applied to a glass surface to be etched before the solvent is quite completely evaporated and while the plastic still retains a certain degree of adhesion, thus assuring that the mass upon the glass surface will be sufficiently cohered together and also that there will be a certain degree of adhesion to the glass itself. Care should be observed that the entire surface of the glass is not coated with a film of plastic; but only those points immediately under the particles. The adhesion between the particles and also between the particles and glass may be promoted by exposing the glass to slight heat or by applying the coated material to glass which has already been heated, for example to a temperature of 100 or 200° C.

A thin layer of sand or the like having plastic coatings on the particles, but uncohered, may, also, be spread upon the glass and then cohered by application of heat or a small amount of a solvent for the plastic. Thus, in order to provide finely-divided silica, particles of which are coated with rubber, sand or spent sand from the grinding of glass may be introduced into a natural or an artificial rubber latex. A precipitating agent, such as formaldehyde may then be introduced into the mixture while the mixture is vigorously agitated, thus precipitating the rubber in situ upon individual particles. After the rubber has become sufficiently hardened, the coated sand may be removed from the medium and spread as a layer ⅛ to ½ inch thick upon the glass. Cohesion between the individual particles and also between the glass and the contiguous particles may be effected by wetting the layer with benzene and evaporating off the excess. The other plastics may be applied as coatings to the finely-divided silica or other inert pigmentary material in similar manner by introducing the finely-divided material into a solution or suspension of plastic and then precipitating the plastic or evaporating off the solvent.

For example, a solution of Vinylite "H" consisting of 1 part by weight of a copolymer of about 13% of vinyl acetate and 87% of vinyl chloride may be dissolved in a solvent, such as acetone to provide a solution of about 23% concentration. About 2 to 10 parts by weight of finely-divided material, e. g., sand, is introduced into this solution and isopropanol or other precipitant is added slowly and while the solution is vigourously agitated. The solution may be cooled to a temperature within the range of 0° C. to 40° C. Sufficient water should then be added substantially to quench or drown the solvent. For example, the non-solvent may be employed in ratio of 5 or 10 times by volume that of the solvent medium. The resultant powder is filtered off and dried.

It is of course apparent that the solvent may be removed by evaporating from a solution of organic plastic containing sand or other inert granular material at an appropriate temperature. Evaporation is not continued to the point of complete dryness of the material, but rather it is discontinued while the mass is still sufficiently plastic to permit of spreading it as a thin layer, for example of an eighth or a quarter of an inch in thickness upon the surface of the glass. Subsequently the remainder of the solvent can be evaporated. The solution of plastic employed in such operation should be relatively dilute, e. g., 5 to 10 percent in concentration so that upon evaporation, the solvent particles of granular material will be merely coated without the voids between the particles being completely filled. The resultant mass, when spread upon the glass, will thus retain a sufficient degree of permeability to permit the etching solution to reach the glass.

In similar manner paraffin or beeswax may be dissolved in benzene or gasoline to form a dilute solution into which sand or other inert material can be introduced. The solvent can then be evaporated off and the coated material sprayed upon glass. A slight degree of heat will assure adhesion between the waxy material and the surface of the glass at the points of the contact.

Sand, or its equivalent, preferably heated, can also be admixed with about 10 to 40 percent by volume of molten wax or paraffin. The coated particles can be cooled, crumbled and spread upon glass as a layer. A little heat will adhere the material to a coherent, porous state.

The glass, after it has been coated with a permeable layer, may be subjected to etching by immersing it in an aqueous solution, e. g., 5 to 15 percent solution of hydrofluoric acid for a period of time dependent upon the depth to which it is desired to etch the surface. A time of etching within the range of 10 minutes to 2 or 3 hours will in most instances be sufficient. The temperature of the etching operation may be substantially atmospheric. The acid is washed out out of the porous layer with water. When the etching operation is completed, the layer of porous material may be removed by scraping or by dissolving out the plastic with a suitable solvent. It is also permissible to heat the glass from below sufficiently to soften the plastic and thus loosen it from the glass. After the layer is removed the surface of the glass may be washed free of residual plastic by application of a solvent.

If the glass has been subjected to the etching action of the acid for a prolonged period, it may be desirable to harden the etched surface, when it has been cleaned, by a baking operation. This is conveniently performed by baking the glass in an ordinary oven at a temperature perhaps of 200 or 300° C. for 10 or 15 minutes.

In some instances, it may be desirable to expose the coated surface to vapors of hydrofluoric acid in a chamber. The temperature of exposure will be sufficient to volatilize silicon fluoride as it forms. The vapors will then permeate the porous layer and attack any exposed surface.

The forms of the invention herein disclosed are to be considered merely as exemplary. It will be apparent to those skilled in the art that numerous modifications may be made therein without departure from the spirit of the invention or the scope of the appended claims.

What is claimed is:

1. A method of etching glass surfaces to provide a matte texture, which comprises coating the surface with a layer of sand the particles of which are coated with individual films of a plastic material which is relatively inert to hydrogen fluoride, then permeating the layer with hydrogen fluoride to etch all exposed points in the surface, and removing the layer.

2. A method of etching a glass surface in order to form a matte finish thereupon, which comprises spreading upon the surface a layer of powdered inert material comprising small particles each of which has an individual coating of an inert plastic cohesive substance, cohering the coatings of the particles at their points of contact with each other and further adhering the particles containing the surface of the glass at the points of contact therewith to mask the points of contact but leave the area between points of contact free and to provide a porous fluid permeable layer above the surface, then applying an etching agent to permeate the resultant porous layer and to etch the unprotected portions of the glass surface between the adherent particles and subsequently removing the layer and cleaning the surface.

FREDERICK W. ADAMS.